United States Patent [19]
Chen

[11] Patent Number: 5,199,520
[45] Date of Patent: Apr. 6, 1993

[54] WHEELED CHAIR

[76] Inventor: Sen-Jung Chen, No. 236, Sec. 3, Ho-Ping W. Rd., Taipei City, Taiwan

[21] Appl. No.: 804,967

[22] Filed: Dec. 11, 1991

[51] Int. Cl.$^5$ .............................................. A61G 5/04
[52] U.S. Cl. .................................. 180/65.5; 180/907; 280/304.1
[58] Field of Search .............. 180/907, 65.5, 6.5, 180/65.1; 280/42, 250.1, 304.1

[56] References Cited

U.S. PATENT DOCUMENTS

| | | | |
|---|---|---|---|
| 3,901,337 | 8/1975 | Cragg | 180/907 |
| 4,415,056 | 11/1983 | Smith | 180/907 |
| 4,773,495 | 9/1988 | Haubenwallner | 180/907 |

FOREIGN PATENT DOCUMENTS

| | | | |
|---|---|---|---|
| 0382873 | 8/1990 | European Pat. Off. | 180/907 |
| 2061543 | 7/1971 | Fed. Rep. of Germany | 180/907 |

*Primary Examiner*—David M. Mitchell
*Attorney, Agent, or Firm*—Ladas & Parry

[57] ABSTRACT

A wheelchair includes a foldable seat portion, a pair of stationary plates each of which is provided on each side of the seat portion. Each stationary plate has a shaft that extends outward upon which a wheel is mounted. A driving unit and a gear assembly which connects the driving unit to the wheel are also mounted on the stationary plate. A rechargeable battery unit is used for actuating the driving unit. The wheelchair further has a control switch for operating the driving unit.

2 Claims, 4 Drawing Sheets

WHEELED CHAIR

BACKGROUND OF THE INVENTION

1. Field of Invention

This invention relates to a chair, more particularly to a wheelchair for a disabled person which is foldable when not in use so that a disabled person can easily take said wheelchair along when she or he is going out.

2. Description of the Related Art

There are already several kinds of wheelchair in the market for disabled people, one of which is shown in FIG. 1. As shown, the wheelchair includes a seat assembly (B) and a pair of wheels (C) which is attached to a shaft fixedly provided under and on both sides of the seat assembly (B) and which is electrically driven by a motor (A). The motor is mounted under the seat.

It is common knowledge that this kind of wheelchair though capable of serving a disabled person has a few drawbacks. For example, since the shaft itself can not be folded, the wheelchair cannot be folded, and therefore, cannot be taken outdoors easily. Although a small motor is generally used to operate the wheelchair, the user of the wheelchair might not be able to get over obstacles, such as an incline, easily.

SUMMARY OF THE INVENTION

It is highly desirable from a humanitarian point of view to provide a wheelchair which is free of the above-stated disadvantages, allowing a disabled person to use a reliable wheelchair without fear of encountering unnecessary difficulty when he or she wants to use said wheelchair.

Accordingly, the wheelchair of the present invention includes a foldable seat adapted to stretch out when desired, a pair of stationary plates, each of which is fixedly provided on a side of the seat and has a shaft extending therefrom, and a pair of wheels each of which is rotatably mounted on the shaft. A gear means mounted on the stationary plate includes a circular toothed plate fixed on the wheel and it connects a driving means to the wheel for moving the latter. The wheelchair also includes a rechargeable battery means for operating the driving means and a control switch actuation of which can operate the driving means so as to move the wheelchair.

BRIEF DESCRIPTION OF THE DRAWINGS

Other features and advantages of the present invention will become apparent in the following detailed description, including drawings, all of which show a non-limiting form of the present invention, and of which.

DETAILED DESCRIPTION OF THE PREFERRED EMBODIMENT

Figure 1:
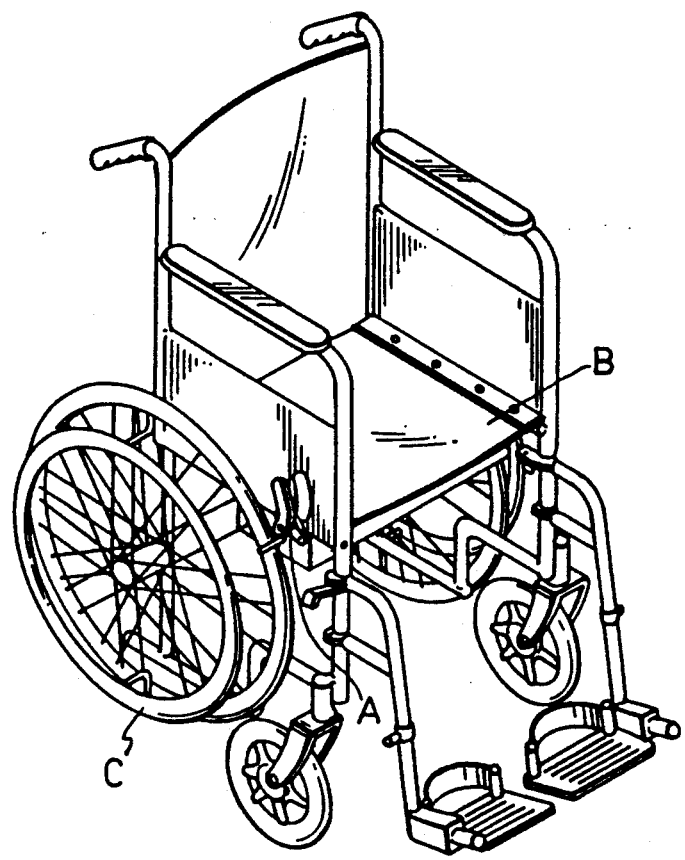
FIG. 1 shows a wheelchair of the prior art.
Figure 2:
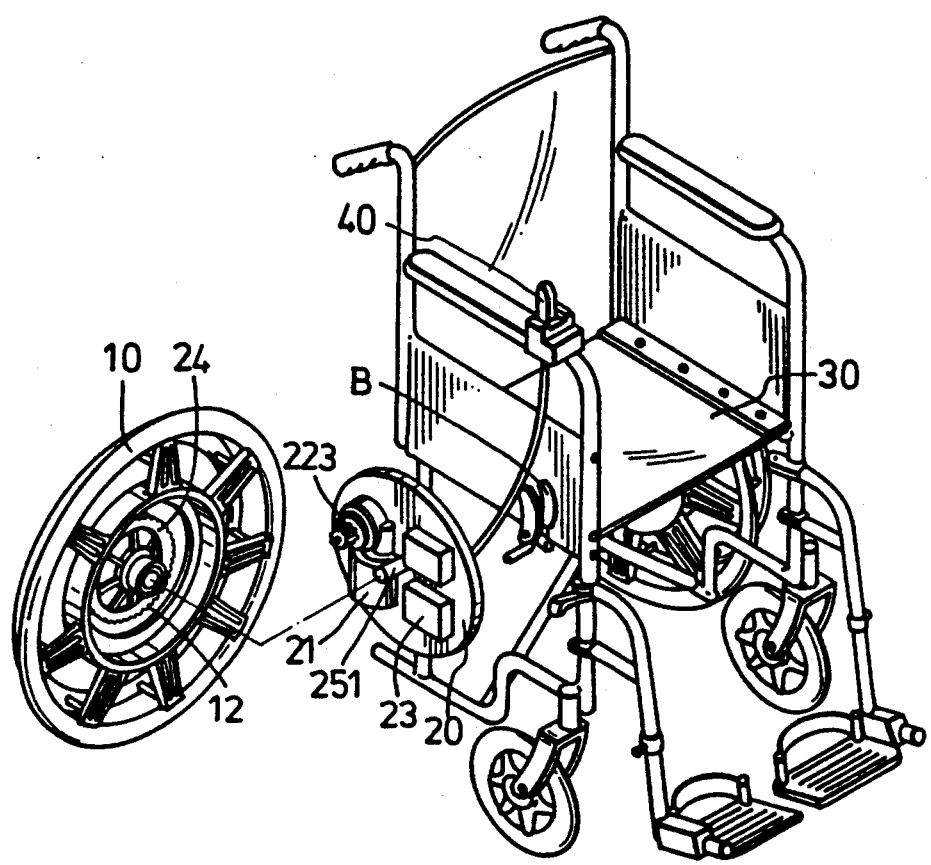
FIG. 2 shows a wheelchair of the present invention.

Referring to FIG. 2, a wheelchair of the present invention is shown to comprise a chair (30) having a seat portion which is made by a known related art and which is capable of being folded or unfolded so that a person can sit thereon, and a pair of stationary plates (20), one each being provided on each side of the seat portion.

Figure 3:
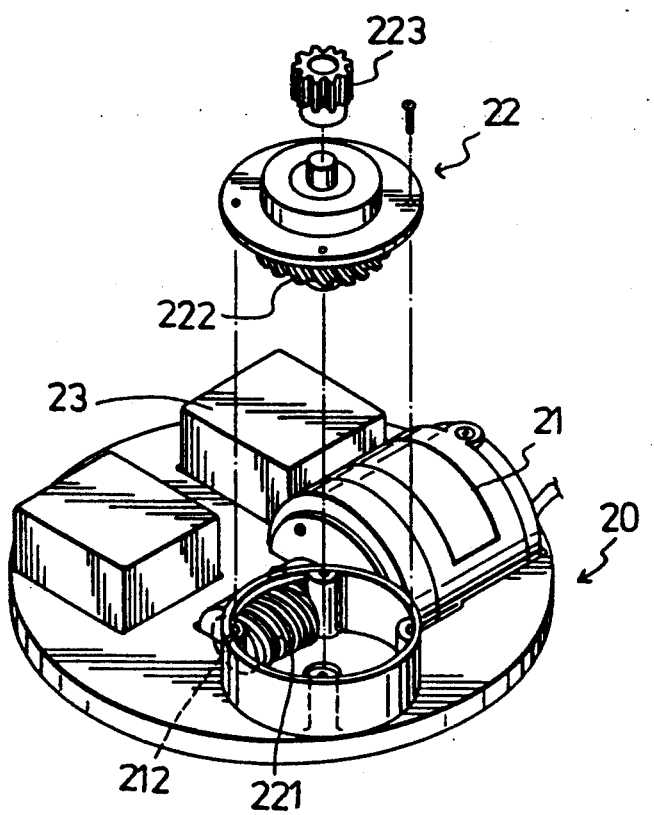
FIG. 3 shows an exploded view of a gear means employed in the wheelchair of the present invention.

Referring to FIGS. 2 and 3, each of the stationary plates has a shaft (251) centrally extending outward from the same. A driving means (21), generally a motor, is fixed on the stationary plate (20) and a gear means (22), including a first and second bevel geared wheels (221,222) which are meshed with one another by a known art and a toothed wheel (223), is also mounted on the stationary plate. It is to be understood that the driving means (21) is driven by a power source generated by a rechargeable battery means (23) which is also mounted on the stationary plate.

Figure 4:
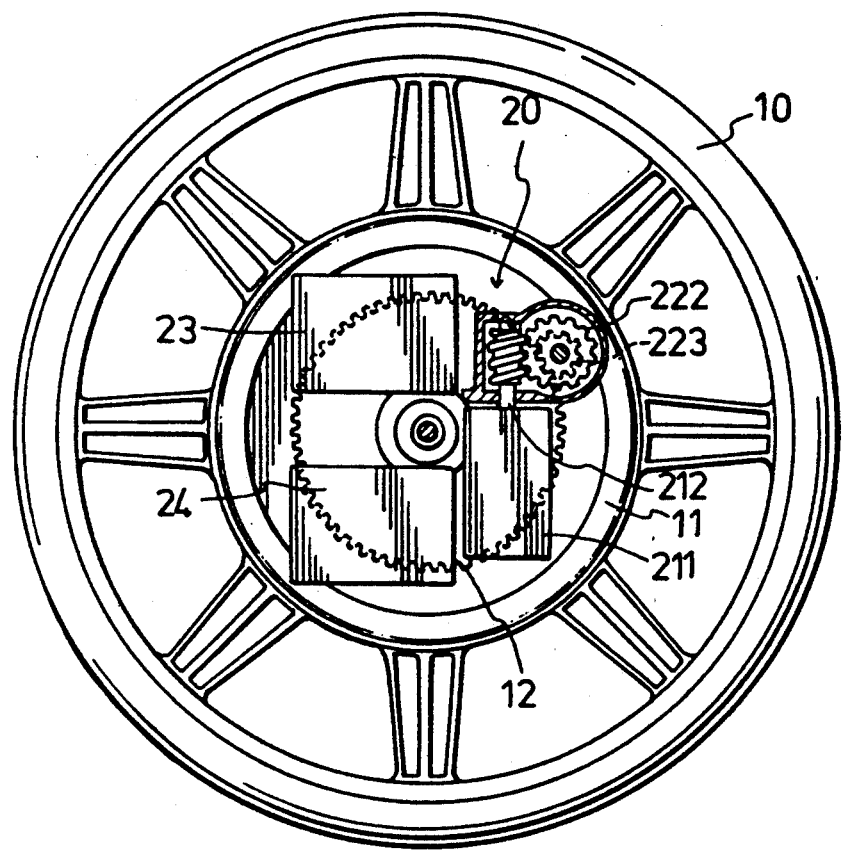
FIG. 4 shows the wheel employed in the wheelchair of the present invention.

Referring to FIG. 4, the wheel (10) employed in the present invention includes a circular plate (24) with a toothed periphery (12) which is fixedly attached to the wheel (10) before it is mounted on the shaft (251) of the stationary plate. Once fixed on the stationary plate, the toothed periphery of the circular plate (24) is meshed by a known related art with the toothed wheel (223) of the gear means so that rotation of the driving means (21) is transmitted to the wheel (10).

A control switch (40) for operating the motor is provided at any suitable place on the wheelchair. A brake (B) for stopping the movement of the wheels can also be made by a known art. It is important to note that in order to move each of the wheels, the two motors each have the same horse power as the motor used in the wheelchair of the prior art, are employed so that the wheelchair of the present invention is more powerful than the wheelchair of the prior art.

Since the wheelchair of the present invention can be folded, it is easy to store and to take along when the user of the same wishes to go out, a feature which the wheelchair of the prior art can hardly accomplish.

With the invention thus explained, it is obvious to those skilled in the art that several modifications and variations can be made without departing from the scope and spirit of the present invention. It is therefore intended that the present invention is intended to be limited only as in the appended claims.

I claim:

1. A wheelchair comprising:
    a chair including a seat;
    means for folding and unfolding said seat;
    a pair of stationary plates each of which is fixedly provided on each side of said seat, said stationary plate having a shaft extending outwardly therefrom;
    a pair of wheels, each of which is rotatably mounted on said shaft of said stationary plate, each wheel having a circular plate with a toothed periphery fixedly attached thereto;
    a driving means mounted on said stationary plate;
    a gear means mounted on said stationary plate and connecting said driving means to said peripheral toothed circular plate of said wheel for transmitting rotation of said driving means to said wheel;
    a rechargeable battery means mounted on said stationary plate, the battery means supplying power to said driving means, whereby the seat may be folded or unfolded without obstruction from the battery means;
    a control switch actuating said driving means to move said wheel.

2. A wheel chair as claimed in claim 1 wherein the shaft extends centrally from the stationary plate.

* * * * *